United States Patent
Hammelef et al.

(10) Patent No.: US 12,319,189 B2
(45) Date of Patent: Jun. 3, 2025

(54) TRANSLATABLE ASSIST HANDLE FOR A VEHICLE

(71) Applicant: GM Global Technology Operations LLC, Detroit, MI (US)

(72) Inventors: David M. Hammelef, Novi, MI (US); Joshua Wargo, Milford, MI (US); Leone Cairine Tory, Scarborough (CA); Alexander Hall, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 304 days.

(21) Appl. No.: 18/083,954

(22) Filed: Dec. 19, 2022

(65) Prior Publication Data
US 2024/0198882 A1 Jun. 20, 2024

(51) Int. Cl.
*B60N 3/02* (2006.01)
(52) U.S. Cl.
CPC .................................... *B60N 3/023* (2013.01)
(58) Field of Classification Search
CPC ............................. B60N 3/023; B60N 3/026
USPC ........................................................ 296/1.02
See application file for complete search history.

(56) References Cited

U.S. PATENT DOCUMENTS

| 7,631,915 | B2 * | 12/2009 | Browne | B60N 3/023 |
| | | | | 16/110.1 |
| 11,548,426 | B2 * | 1/2023 | Zarraga | B60N 3/026 |
| 11,738,677 | B1 * | 8/2023 | Salter | B60N 3/023 |
| | | | | 296/180.1 |
| 11,833,949 | B2 * | 12/2023 | Paradis | B62D 25/04 |
| 12,059,990 | B2 * | 8/2024 | Ota | B60N 3/026 |
| 2012/0133168 | A1 * | 5/2012 | Ardigo | B60N 3/026 |
| | | | | 296/1.02 |
| 2022/0176860 | A1 * | 6/2022 | Zarraga | B62D 25/04 |
| 2022/0348135 | A1 * | 11/2022 | Cho | B60Q 3/51 |
| 2024/0198882 | A1 * | 6/2024 | Hammelef | B60N 3/023 |

FOREIGN PATENT DOCUMENTS

| DE | 202013102552 U1 * | 8/2013 | ............ B60N 3/023 |
| KR | 19980017358 U * | 7/1998 | ............ B60N 3/023 |

* cited by examiner

*Primary Examiner* — Jason S Morrow
(74) *Attorney, Agent, or Firm* — CANTOR COLBURN LLP

(57) ABSTRACT

A translatable assist handle system for a vehicle includes a guide track having a first end, a second end, and an intermediate portion having a guide surface that extends around at least a portion of a vehicle opening between the first end and the second end. A translatable assist handle including a guide element is disposed in the guide track. The translatable assist handle is selectively positionable along the guide track providing an adjustable hand hold aiding a passenger to ingress and egress from the vehicle.

20 Claims, 5 Drawing Sheets

TRANSLATABLE ASSIST HANDLE FOR A VEHICLE

INTRODUCTION

The subject disclosure relates to the art of assist handles and, more particularly, to a translatable assist handle for a vehicle.

Most passenger vehicles include fixed assist handles that may be used by passengers to aide in getting into and out of the vehicle. The handles are typically mounted along a door frame. The location of the assist handles varies and may depend on various factors including seat configuration, door frame structure, and the like. In addition to factory assist handles which are fixedly mounted to the vehicle, there exist after-market assist handles that interact with door latch features. After the door is opened, the after-market assist handle is temporarily inserted into the door latch feature and provides a support surface that may aid a passenger in egressing from the vehicle.

Unfortunately, many users find the position of the assist handle to be impractical for their particular needs. The handle may be too far forward, or may be otherwise out of reach. If not in a convenient location for the user, the assist handle may not be utilized. In such a case, the user may find it difficult to get into or out from the vehicle. After market handles may get lost, and are not designed to fit each vehicle. Accordingly, it is desirable to provide an assist handle that may be adjusted to suit a particular user's needs.

SUMMARY

A translatable assist handle system for a vehicle, in accordance with a non-limiting example, includes a guide track having a first end, a second end, and an intermediate portion having a guide surface that extends around at least a portion of a vehicle opening between the first end and the second end. A translatable assist handle including a guide element is disposed in the guide track. The translatable assist handle is selectively positionable along the guide track providing an adjustable hand hold aiding a passenger to ingress and egress from the vehicle.

In addition to one or more of the features described herein the guide track includes a plurality of stop features that establish a plurality of positions for the translatable assist handle.

In addition to one or more of the features described herein the guide element includes a recess that is selectively receptive of at least one of the plurality of stop features.

In addition to one or more of the features described herein the recess includes a first recess and a second recess, the first recess being selectively receptive of one of the plurality of stop features and the second recess being selectively receptive of another of the plurality of stop features.

In addition to one or more of the features described herein a biasing element is disposed between the guide track and the guide element, the biasing element urging the guide element towards the guide surface.

In addition to one or more of the features described herein a shuttle is operatively connected to the guide element, the shuttle selectively shifting the translatable assist handle along the guide track between the first end and the second end.

In addition to one or more of the features described herein a motor is operatively connected to the shuttle, the motor selectively shifting the translatable assist handle along the guide track.

In addition to one or more of the features described herein a motor controller is operatively connected to the motor, the motor controller being operable to shift the translatable assist handle to one or more of a plurality of pre-set translatable assist handle positions.

In addition to one or more of the features described herein the guide track includes a first guide track portion extending around a first portion of the vehicle opening and a second guide track portion extending about a second portion of the vehicle opening.

In addition to one or more of the features described herein the first guide track portion includes a first guide element insertion section and the second guide track portion includes a second guide element insertion section, the first guide element insertion section facilitating insertion of the translatable assist handle into the first guide track portion and the second guide element insertion section facilitating insertion of the translatable assist handle in the second guide track portion.

A vehicle according to a non-limiting example includes a body having a passenger compartment. The body includes an opening that exposes the passenger compartment to passengers. A translatable assist handle system includes a guide track having a first end, a second end, and an intermediate portion having a guide surface that extends around at least a portion of the opening between the first end and the second end. A translatable assist handle includes a guide element disposed in the guide track. The translatable assist handle is selectively positionable along the guide track providing an adjustable hand hold aiding a passenger to ingress and egress from the passenger compartment.

In addition to one or more of the features described herein the guide track includes a plurality of stop features that establish a plurality of positions for the translatable assist handle.

In addition to one or more of the features described herein the guide element includes a recess that is selectively receptive of at least one of the plurality of stop features.

In addition to one or more of the features described herein the recess includes a first recess and a second recess, the first recess being selectively receptive of one of the plurality of stop features and the second recess being selectively receptive of another of the plurality of stop features.

In addition to one or more of the features described herein a biasing element is disposed between the guide track and the guide element, the biasing element urging the guide element towards the guide surface.

In addition to one or more of the features described herein a shuttle is operatively connected to the guide element, the shuttle selectively shifting the translatable assist handle along the guide track between the first end and the second end.

In addition to one or more of the features described herein a motor is operatively connected to the shuttle, the motor selectively shifting the translatable assist handle along the guide track.

In addition to one or more of the features described herein a motor controller is operatively connected to the motor, the motor controller being operable to shift the translatable assist handle to one or more of a plurality of pre-set translatable assist handle positions.

In addition to one or more of the features described herein the guide track includes a first guide track portion extending around a first portion of the opening and a second guide track portion extending about a second portion of the opening.

In addition to one or more of the features described herein the first guide track portion includes a first guide element insertion section and the second guide track portion includes a second guide element insertion section, the first guide element insertion section facilitating insertion of the translatable assist handle into the first guide track portion and the second guide element insertion section facilitating insertion of the translatable assist handle in the second guide track portion.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
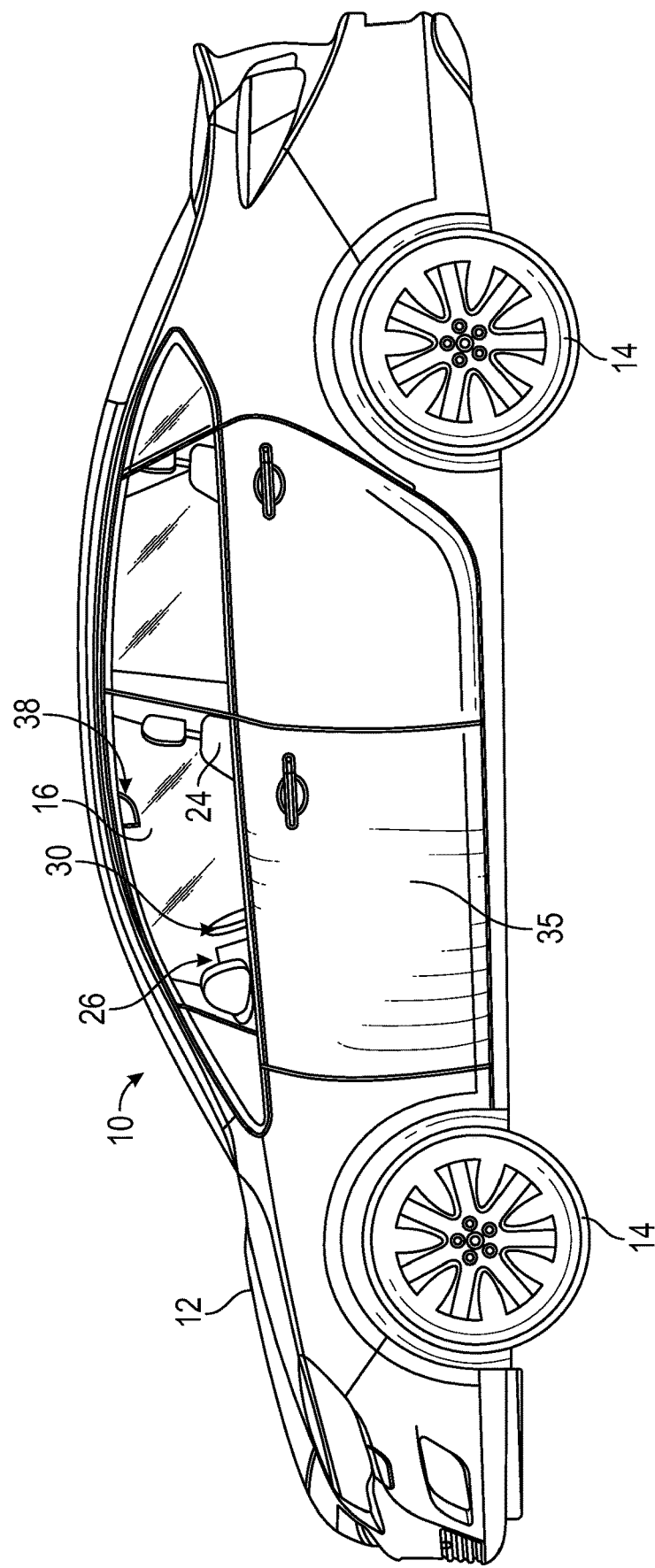
FIG. 1 is a left side view of a vehicle including a translatable assist handle, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 14. At least two of the plurality of wheels 14 are steerable. Body 12 defines, in part, a passenger compartment 16 having seats, one of which is indicated at 24, positioned behind a dashboard 26. A steering control system 30 is arranged between seats 24 and dashboard 26. Steering control system 30 is operated to control the orientation of the steerable wheels.

Figure 2A:
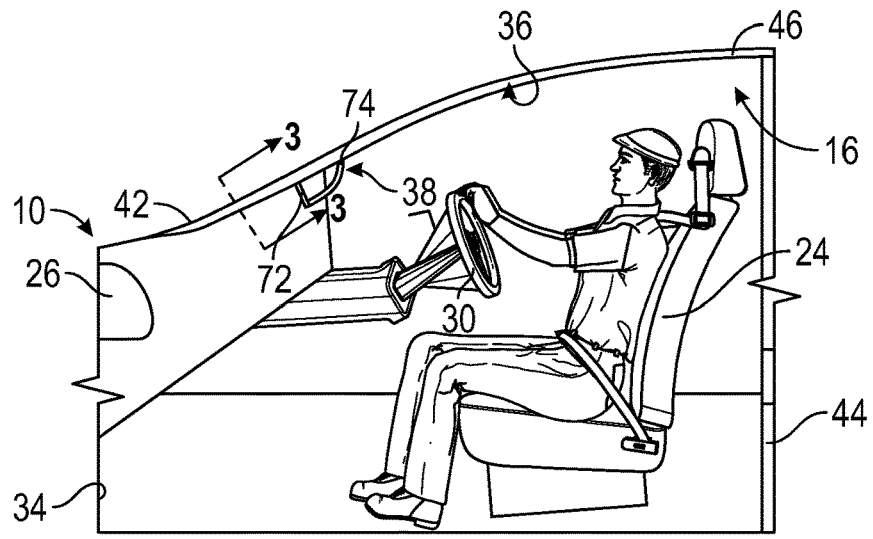
FIG. 2A is a partial side view of the vehicle of FIG. 1 showing the translatable assist handle at a first position in a guide track that extends about an opening into a passenger compartment, in accordance with a non-limiting example.
Figure 2B:
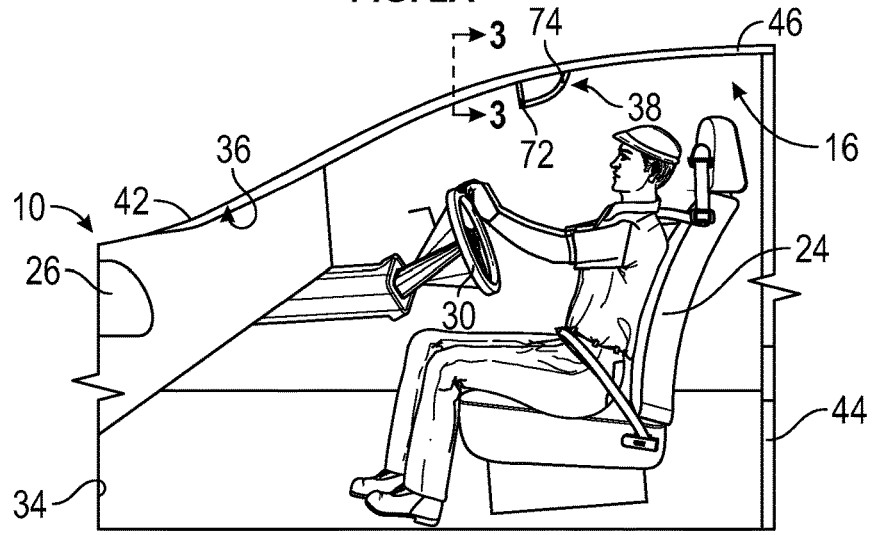
FIG. 2B is a partial side view of the vehicle of FIG. 1 showing the translatable assist handle at a second position in a guide track that extends about an opening into a passenger compartment, in accordance with a non-limiting example.
Figure 2C:
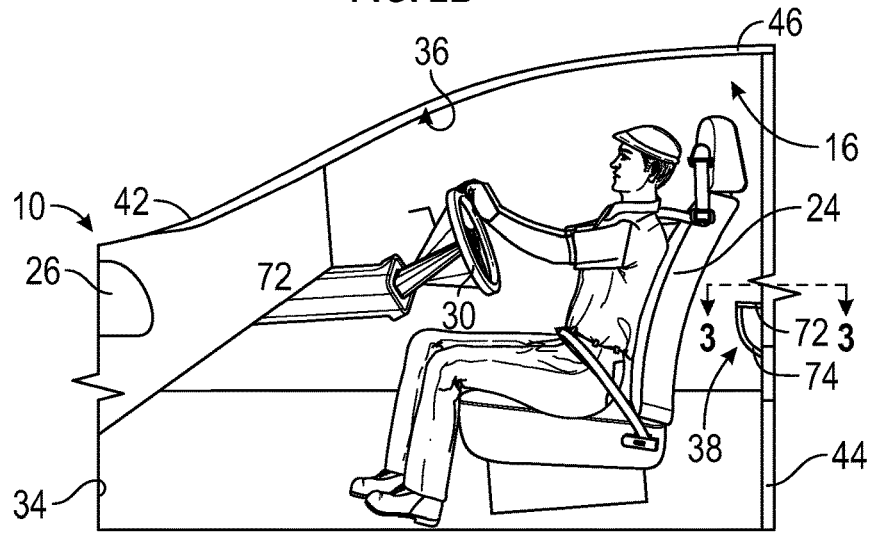
FIG. 2C is a partial side view of the vehicle of FIG. 1 showing the translatable assist handle at a third position in a guide track that extends about an opening into a passenger compartment, in accordance with a non-limiting example.

Referring to FIGS. 2A, 2B, and 2C, and with continued reference to FIG. 1, vehicle 10 includes an opening 34 typically covered by a door 35. A guide track 36 extends about a portion of opening 34. Guide track 36 supports a translatable assist handle 38. Guide track 36 includes a first end 42, a second end 44, and an intermediate portion 46. Translatable assist handle 38 may move between a first position (FIG. 2A), a second position (FIG. 2B) and a third position (FIG. 2C). Of course, it should be understood that translatable assist handle 38 may be positioned anywhere along guide track 36 between first end 42 and second end 44.

Figure 3:
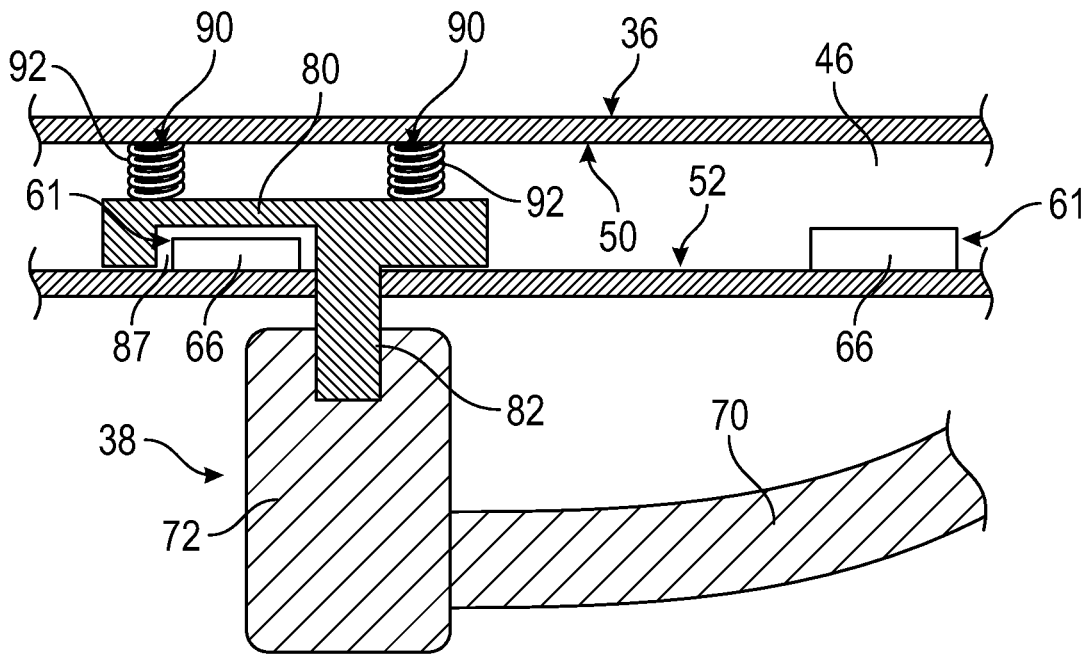
FIG. 3 is a partial cross-sectional view of the guide track of FIG. 2A taken through the line 3-3, in accordance with a non-limiting example.
Figure 4:
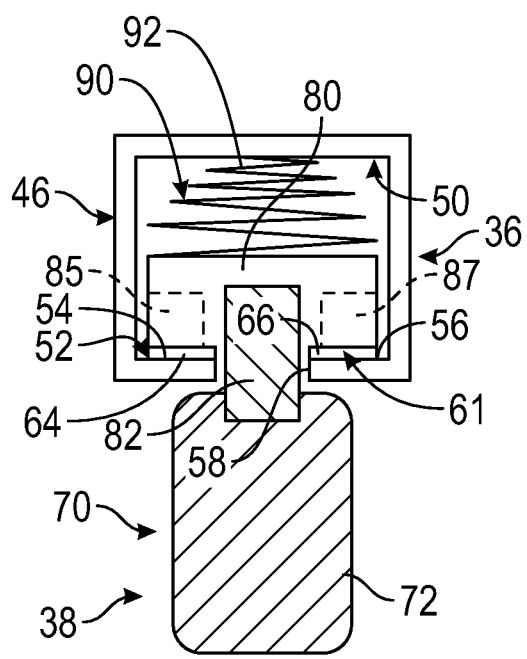
FIG. 4 is a cross-sectional end view of the translatable assist handle in the guide track of FIG. 2 in a locked position, in accordance with a non-limiting example.
Figure 5:
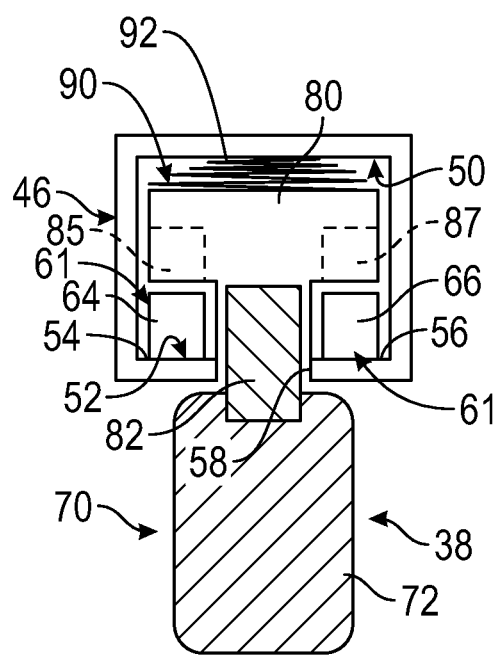
FIG. 5 is a cross-sectional end view of the translatable assist handle in the guide track of FIG. 4 in an unlocked position, in accordance with a non-limiting example.

As shown in FIG. 3, guide track 36 includes a first surface 50 and a second or guide surface 52. As shown in FIGS. 4 and 5, guide surface 52 includes a first surface portion 54 and a second surface portion 56 separated by a gap 58. In a non-limiting example, a plurality of stop features 61 are spaced out along intermediate portion 46. Stop features 61 are engaged by translatable assist handle 38 to establish a plurality of discrete handle adjustment positions. In a non-limiting example, plurality of stop features 61 includes first plurality of stop elements such as shown at 64 arranged on first surface portion 54 and a second plurality of stop elements such as shown at 66 arranged on second surface portion 56.

In a non-limiting example, translatable assist handle 38 includes a handle portion 70, a first support 72 and a second support 74 (FIG. 2A). A detailed description will follow to describing first support 72 with an understanding that second support 74 may include similar structure. It should be further understood that while shown with two supports (i.e., first support 72 and second support 74), translatable assist handle 38 may include only a single support. Translatable assist handle 38 includes a guide element 80 that is arranged in guide track 36 and is operatively connected to first support 72 through a pin or fastener 82. First support 72 may be removed from guide track 36 in order to change to another translatable assist handle in order to take advantage of other designs, colors, or other attributes including readily replacing a damaged handle.

Figure 6:
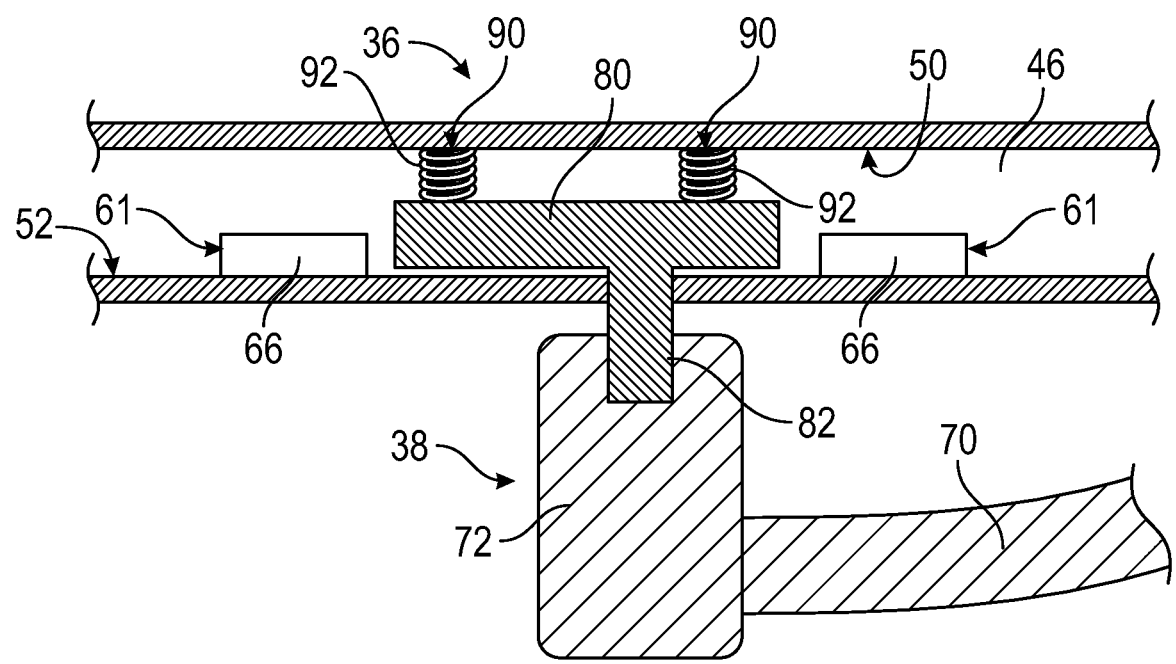
FIG. 6 is a cross-sectional view of the guide track, in accordance with another non-limiting example.

Guide element 80 includes a first recess 85 and a second recess 87. First recess 85 and second recess 87 are sized and positioned to be receptive of first stop element 64 and second stop element 66 respectively. Alternatively guide element 80 maybe be formed without recesses as shown in FIG. 6 and simply sized to fit or nest between adjacent stop features 61 spaced from one another along intermediate portion 46. A biasing element 90 shown in the form of coil springs 92 urges guide element 80 toward first surface portion 54 and second surface portion 56.

In a non-limiting example, translatable assist handle 38 may be urged toward first surface 50 compressing biasing element 90 and translated along intermediate portion 46 of guide track 36 to a position adjacent a selected one of the plurality of stop features 61. Translatable assist handle 38 may be released causing biasing element 90 to urge guide element 80 toward guide surface 52. First recess 85 may capture first stop element 64 and second recess 87 may capture second stop element 66. When first stop element 64 and second stop element 66 are captured by guide element 80, or guide element 80 nests between adjacent stop features 61, translatable assist handle 38 is fixed in position along guide track 36.

Figure 7:
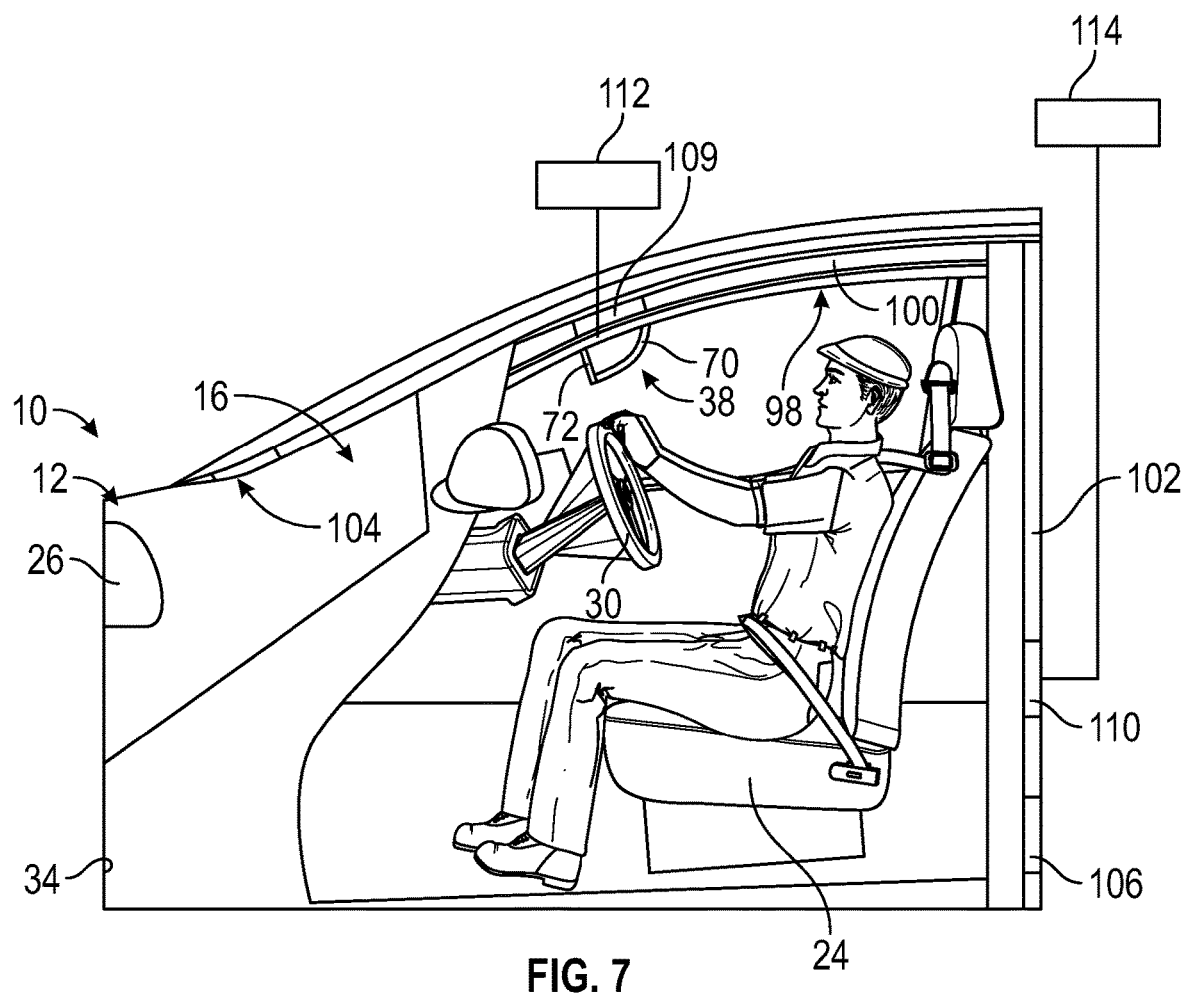
FIG. 7 is a partial side view of the vehicle of FIG. 1 showing the translatable assist handle in a guide track that extends about an opening into a passenger compartment, in accordance with another non-limiting example.

Reference will now follow to FIG. 7 in describing a guide track 98 in accordance with another non-limiting example. Guide track 98 includes a first guide track portion 100 and a second guide track portion 102. By using two distinct guide tracks, a sharper corner may exist along a B-pillar portion (not separately labeled) of body 12. First guide track portion 100 includes a first guide element insertion section 104 and second guide track portion 102 includes a second guide element insertion section 106. First guide element insertion section 104 allows guide element 80, FIG. 3, to be installed into first guide track portion 100 and second guide element insertion section 106 allows guide element 80 to be installed in second guide track portion 102. In this manner translatable assist handle may be removed and reinstalled in the guide track portion most convenient to a user.

In a non-limiting example, a first shuttle 109 may be arranged in first guide track portion 100 and a second shuttle 110 may be arranged in second guide track portion 102. First shuttle 109 is operatively connected to a first motor 112 and second shuttle 110 is operatively connected to a second motor 114. In a non-limiting example, translatable assist handle 38 may be connected with first shuttle 109 when coupled to first guide track portion 100 and to second shuttle 110 when coupled to second guide track portion 102. First shuttle 109, when first motor 112 is activated, will automatically translate translatable assist handle 38 along first guide track portion 100 and second shuttle 110, when second motor is activated, will automatically translate translatable assist handle 38 along second guide track portion 102. Translatable assist handle 38 may be readily disconnected from either first shuttle 109 and second shuttle 110 and removed from guide track 98 in order to change to another translatable assist handle in order to take advantage of other designs, colors, or other attributes including readily replacing a damaged handle.

Figure 8:
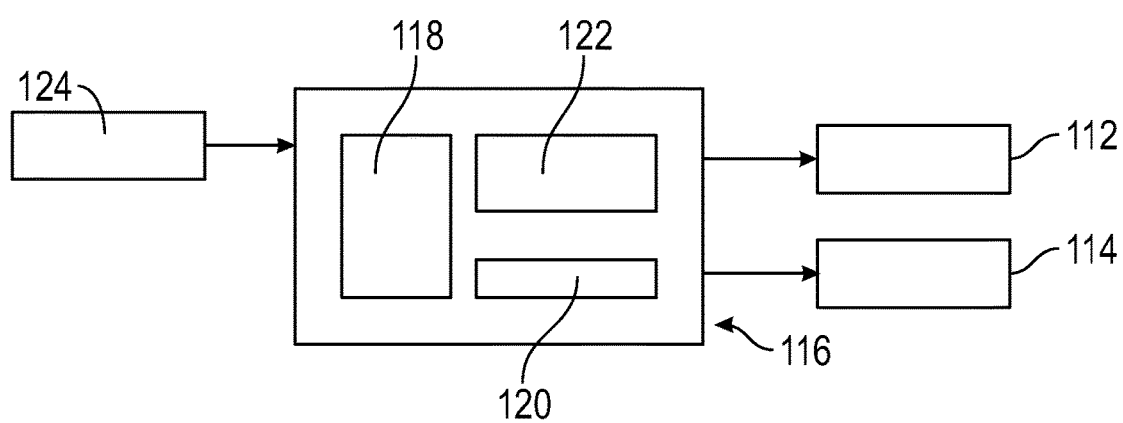
FIG. 8 is a block diagram illustrating a motor controller for the translatable assist handle of FIG. 6, in accordance with a non-limiting example.

In a non-limiting example, first motor 112 and second motor 114 are connected to a motor controller 116 as shown in FIG. 8. Motor controller 116 includes a central processing unit (CPU) 118, a non-volatile memory 120 and a translatable assist handle control module 122. In addition to being coupled to first motor 112 and second motor 114, motor controller 116 is connected to a translatable assist handle actuator 124. A user may employ translatable assist handle actuator 124 to shift translatable assist handle 38 to a selected position along first guide track portion 100 and second guide track portion 102. Non-volatile memory 120 may store user preferences for handle position when entering and/or exiting vehicle 10.

At this point, it should be appreciated that the translatable assist handle may move along one or more vehicle surfaces (window line, roof line, and/or B-pillar) in order to suit a particular users needs and/or physical requirements. The translatable assist handle may be moved manually along a guide track and secured in position by locking elements, friction brakes and the like. The translatable assist handle may also be moved by a motor. Regardless of the motive force, the translatable assist handle may be moved to a location of greatest utility to a user.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A translatable assist handle system for a vehicle comprising:
   a guide track having a first end, a second end, and an intermediate portion having a guide surface configured to extend around at least a portion of a vehicle opening between the first end and the second end; and
   a translatable assist handle including a guide element disposed in the guide track, the translatable assist handle being selectively positionable along the guide track providing an adjustable hand hold configured to aid a passenger to ingress and egress from the vehicle,
   wherein the guide track includes a plurality of stop features that establish a plurality of positions for the translatable assist handle, and
   wherein the guide element includes a recess that is selectively receptive of at least one of the plurality of stop features.

2. A translatable assist handle system for a vehicle comprising:
   a guide track having a first end, a second end, and an intermediate portion having a guide surface configured to extend around at least a portion of a vehicle opening between the first end and the second end; and
   a translatable assist handle including a guide element disposed in the guide track, the translatable assist handle being selectively positionable along the guide track providing an adjustable hand hold configured to aid a passenger to ingress and egress from the vehicle,
   wherein the guide track includes a first guide track portion configured to extend around a first portion of the vehicle opening and a second guide track portion configured to extend about a second portion of the vehicle opening, and wherein the first guide track portion includes a first guide element insertion section and the second guide track portion includes a second guide element insertion section, the first guide element insertion section facilitating insertion of the translatable assist handle into the first guide track portion and the second guide element insertion section facilitating insertion of the translatable assist handle in the second guide track portion.

3. The translatable assist handle system according to claim 2, wherein the guide track includes a plurality of stop features that establish a plurality of positions for the translatable assist handle.

4. The translatable assist handle system according to claim 3, wherein the guide element includes a recess that is selectively receptive of at least one of the plurality of stop features.

5. The translatable assist handle system according to claim 1, wherein the recess includes a first recess and a second recess, the first recess being selectively receptive of one of the plurality of stop features and the second recess being selectively receptive of another of the plurality of stop features.

6. The translatable assist handle system according to claim 1, further comprising a biasing element disposed between the guide track and the guide element, the biasing element urging the guide element towards the guide surface.

7. The translatable assist handle system according to claim 1, further comprising a shuttle operatively connected to the guide element, the shuttle selectively shifting the translatable assist handle along the guide track between the first end and the second end.

8. The translatable assist handle system according to claim 7, further comprising a motor operatively connected to the shuttle, the motor selectively shifting the translatable assist handle along the guide track.

9. The translatable assist handle system according to claim 8, further comprising a motor controller operatively connected to the motor, the motor controller being operable to shift the translatable assist handle to one or more of a plurality of pre-set translatable assist handle positions.

10. The translatable assist handle system according to claim 1, wherein the guide track includes a first guide track portion configured to extend around a first portion of the vehicle opening and a second guide track portion configured to extend about a second portion of the vehicle opening.

11. A vehicle comprising:
a body including a passenger compartment, the body including an opening that exposes the passenger compartment to passengers; and
a translatable assist handle system including
a guide track having a first end, a second end, and an intermediate portion having a guide surface that extends around at least a portion of the opening between the first end and the second end; and
a translatable assist handle including a guide element disposed in the guide track, the translatable assist handle being selectively positionable along the guide track providing an adjustable hand hold aiding a passenger to ingress and egress from the passenger compartment,
wherein the opening defines a periphery, and
wherein the translatable assistant handle is movable along the periphery of the opening.

12. The vehicle according to claim 11, wherein the guide track includes a plurality of stop features that establish a plurality of positions for the translatable assist handle.

13. The vehicle according to claim 12, wherein the guide element includes a recess that is selectively receptive of at least one of the plurality of stop features.

14. The vehicle according to claim 13, wherein the recess includes a first recess and a second recess, the first recess being selectively receptive of one of the plurality of stop features and the second recess being selectively receptive of another of the plurality of stop features.

15. The vehicle according to claim 13, further comprising a biasing element disposed between the guide track and the guide element, the biasing element urging the guide element towards the guide surface.

16. The vehicle according to claim 11, further comprising a shuttle operatively connected to the guide element, the shuttle selectively shifting the translatable assist handle along the guide track between the first end and the second end.

17. The vehicle according to claim 16, further comprising a motor operatively connected to the shuttle, the motor selectively shifting the translatable assist handle along the guide track.

18. The vehicle according to claim 17, further comprising a motor controller operatively connected to the motor, the motor controller being operable to shift the translatable assist handle to one or more of a plurality of pre-set translatable assist handle positions.

19. The vehicle according to claim 11, wherein the guide track includes a first guide track portion extending around a first portion of the opening and a second guide track portion extending about a second portion of the opening.

20. The vehicle according to claim 19, wherein the first guide track portion includes a first guide element insertion section and the second guide track portion includes a second guide element insertion section, the first guide element insertion section facilitating insertion of the translatable assist handle into the first guide track portion and the second guide element insertion section facilitating insertion of the translatable assist handle in the second guide track portion.

* * * * *